(12) United States Patent
Hensley et al.

(10) Patent No.: US 7,604,183 B1
(45) Date of Patent: Oct. 20, 2009

(54) LAWN CARE SERVICE TRUCK HAVING AN ELECTRIC/HYDRAULIC LIQUID DISTRIBUTING SYSTEM AND METHOD OF USE

(75) Inventors: Tommy Hensley, Tipp City, OH (US); Mark J. Hensley, Tipp City, OH (US)

(73) Assignee: FabMetals, Inc., New Carlisle, OH (US)

( * ) Notice: Subject to any disclaimer, the term of this patent is extended or adjusted under 35 U.S.C. 154(b) by 462 days.

(21) Appl. No.: 11/520,427

(22) Filed: Sep. 13, 2006

(51) Int. Cl.
*A01G 25/09* (2006.01)
*E01C 19/16* (2006.01)
*E01H 3/02* (2006.01)
*B60K 17/28* (2006.01)
*B60K 25/00* (2006.01)

(52) U.S. Cl. .......... 239/172; 239/195; 239/197; 180/53.4; 180/53.5

(58) Field of Classification Search .......... 239/1, 239/146, 155, 172, 195, 197, 289; 169/24; 180/53.1, 53.4, 53.5, 53.8; 222/627; 307/44–46, 307/64–66
See application file for complete search history.

(56) References Cited

U.S. PATENT DOCUMENTS

| | | | |
|---|---|---|---|
| 4,236,673 A | 12/1980 | Lake | |
| 5,180,108 A | 1/1993 | Miyamoto | |
| 6,082,630 A * | 7/2000 | Bohrer | .......... 239/127 |
| 6,164,560 A | 12/2000 | Lehrke et al. | |
| 6,994,274 B2 | 2/2006 | Thompson et al. | |
| 7,145,788 B2 * | 12/2006 | Plummer | .......... 363/141 |

* cited by examiner

*Primary Examiner*—Darren W Gorman
(74) *Attorney, Agent, or Firm*—Jacox, Meckstroth & Jenkins

(57) ABSTRACT

A lawn care vehicle or truck has a 24 volt auxiliary battery supply connected to operate an electric motor driven hydraulic pump connected to operate a hydraulic motor which drives a liquid chemical distributing pump in a line extending from a liquid supply tank to a flexible hose extending from a hose reel. The auxiliary battery supply is connected to the 12 volt truck battery through a voltage converter for recharging by the battery charger driven by the truck engine. When the truck arrives at a lawn care site, the truck engine is shut down, and the liquid distributing pump is operated by the auxiliary battery supply. The electric motor driven hydraulic pump is also connected to a hydraulic motor coupled to rotate the hose reel. A 110 volt battery charger connects with the voltage converter for recharging the auxiliary battery supply when the truck is not in use.

19 Claims, 7 Drawing Sheets

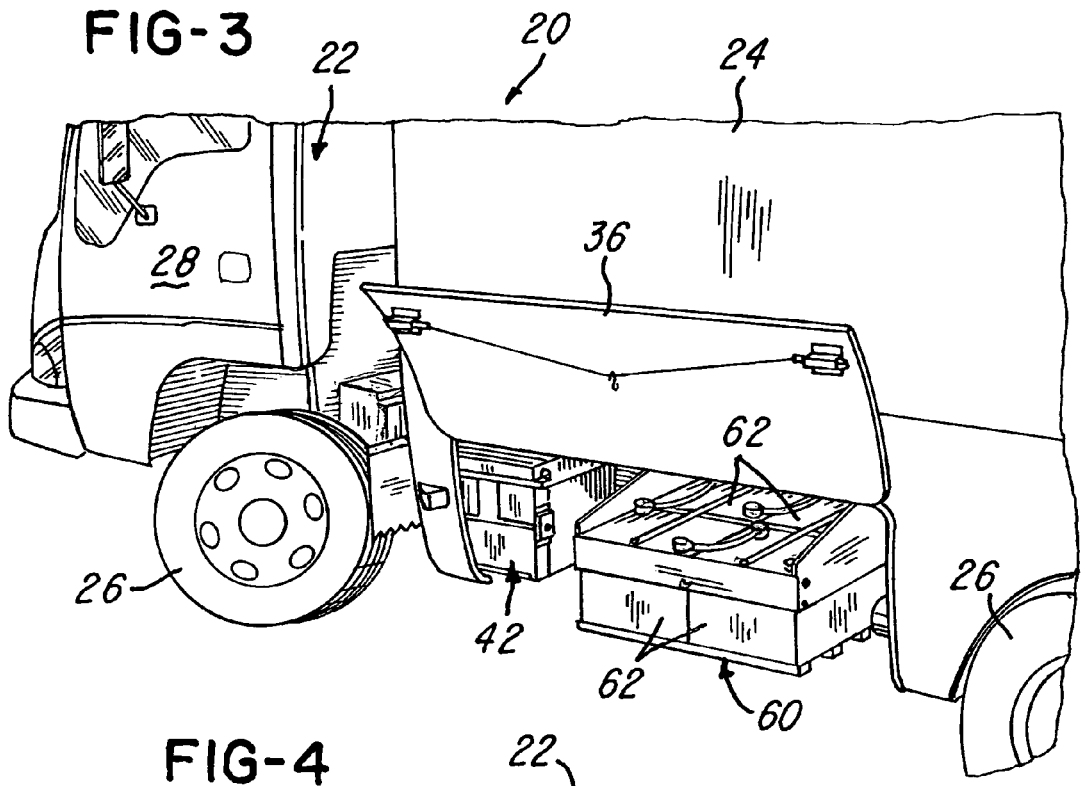
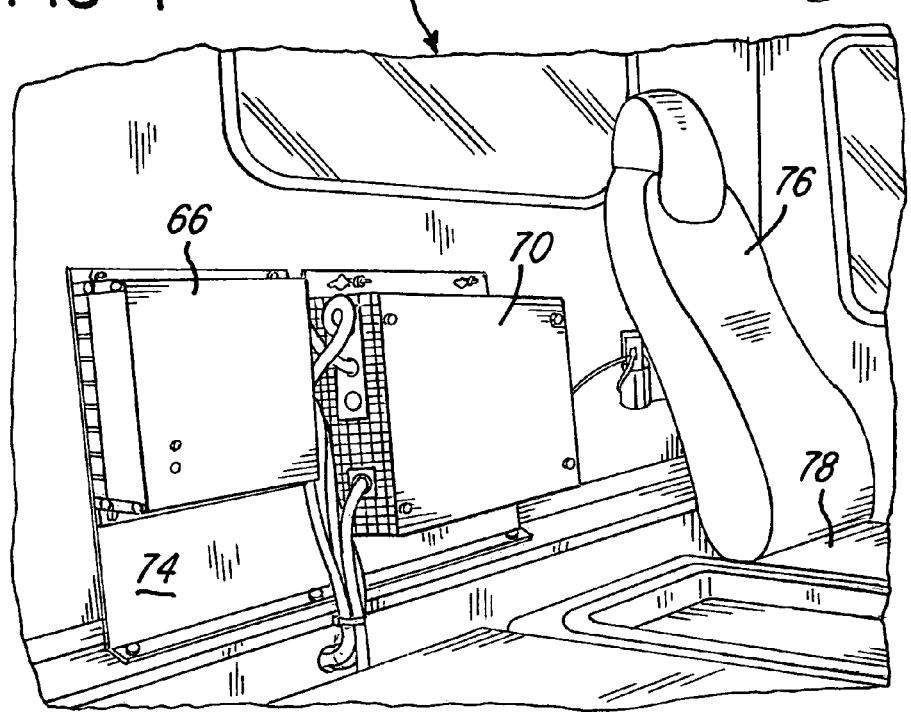

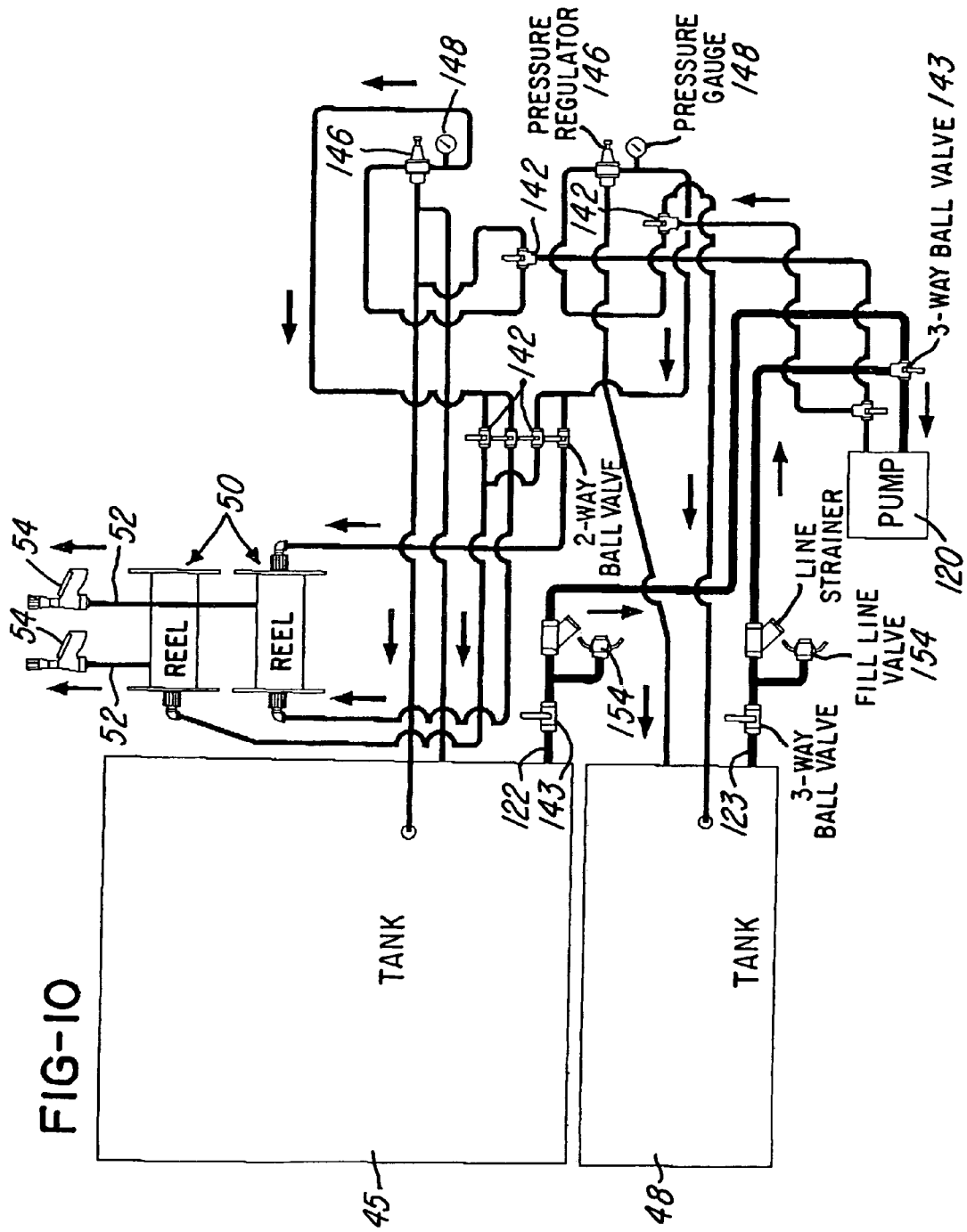

LAWN CARE SERVICE TRUCK HAVING AN ELECTRIC/HYDRAULIC LIQUID DISTRIBUTING SYSTEM AND METHOD OF USE

BACKGROUND OF THE INVENTION

In the application of liquid fertilizers, liquid weed killers and other liquid chemicals to lawns of residences and commercial buildings, it is common to use a mobile vehicle such as a four wheel truck which carries one or more supply tanks for the fertilizer or other liquid chemicals. Each chemical is distributed or dispensed through a flexible hose extending from a hose reel mounted within the truck, and the outer end of the hose has a manually operated spray nozzle with a control valve. A liquid supply pump is commonly driven directly by a shaft connected to the power takeoff (PTO) of the truck engine. The pump has also been driven by a hydraulic motor which receives hydraulic fluid from a hydraulic pump driven from the PTO of the truck engine. The hose reel may also be driven or rotated by an electric motor or by a hydraulic motor connected to the hydraulic pump driven by the PTO, and controls are provided near the hose reel to control the hose reel motor.

In order to operate the liquid chemical supply pump at a site where lawn care services are desired, the truck engine is set to idle at a predetermined speed in order to provide continuous power to the chemical supply pump driven from the PTO of the truck engine. In a full day of operation of a typical lawn care truck, the engine may idle approximately six hours, consuming about one-half gallon of fuel per hour. Thus during a normal day of operation, an idling lawn care truck consumes about three gallons of fuel which would amount to approximately 600 gallons of fuel per year for 200 days of operation. At a cost of about $3.00 per gallon of fuel, an idling truck may consume approximately $1800 of fuel a year. In view of the fact that there is many thousands of lawn care trucks in use, the total cost for pumping liquid chemicals to a lawn is very substantial.

It has been known to operate a liquid chemical supply pump using an electric motor driven supply pump supplied with electricity from the vehicle or truck electrical power system, for example, as disclosed in U.S. Pat. No. 4,236,673 and U.S. Pat. No. 6,164,560. However, use of an electric motor driven supply pump drains the vehicle electrical power system and does not permit the vehicle or truck engine to be shut down at successive lawn care sites which are in close driving distances. It has also been known to drive or operate the liquid chemical supply pump from a separate engine considerably smaller than the truck engine, for example, as disclosed in U.S. Pat. No. 5,180,108 and U.S. Pat. No. 6,994,274. The '108 patent also discloses that the smaller engine may be operated from the fuel supply for the truck engine. However, the use of a separate smaller engine to operate the distribution pump for the liquid chemical spraying system requires significant additional maintenance of the smaller engine to assure that it is dependable every day of use. The additional engine also adds significantly to the cost of the system and increases the consumption of fuel.

SUMMARY OF THE INVENTION

The present invention is directed to a lawn care vehicle, herein referred to as a truck, and of the general type described above, and which incorporates an improved and efficient system and method for operating each liquid chemical distribution pump and each hose reel. The system permits the truck engine to be shut down at each lawn care site while each lawn care chemical is being sprayed onto the lawn from the distribution hose by the operator of the spray nozzle. The system of the invention is also dependable in operation and minimizes maintenance, and permits the lawn care truck to stop at lawn care sites located at short driving intervals. Thus the system and method of the invention provide for a substantial total savings in fuel costs by permitting the truck engine to be shut down at each lawn care site.

In general, a lawn care truck is constructed and used in accordance with the invention by combining the conventional 12 volt electrical battery supply on the truck with a higher voltage or 24 volt auxiliary battery supply which is connected to operate an electric motor driven hydraulic pump. The hydraulic pump is connected to operate a hydraulic motor which drives the liquid distributing pump in a line connecting a liquid supply tank to a flexible hose extending from a hose reel. The 24 volt auxiliary battery supply is connected to the 12 volt truck battery through a voltage converter and is recharged by the truck battery charger or alternator driven by the truck engine.

When the truck arrives at a lawn care site, the truck engine is shut down, and the liquid distributing pump is operated by the 24 volt auxiliary battery supply. The electric motor driven hydraulic pump may also be connected to drive a hydraulic motor coupled to rotate the hose reel and may also be used for driving an additional hydraulic motor for a second hose reel. The 24 volt auxiliary battery supply is recharged from the 12 volt truck battery charger or alternator through the voltage converter while the truck is moving from one lawn care site to the next lawn care site so that the auxiliary battery supply provides sufficient electrical power to the pump unit to operate each hydraulic motor. The truck may also incorporate a 110 volt battery charger which is connected to the voltage converter for recharging the truck battery and the auxiliary battery supply when the truck is not in use.

Other features and advantages of the invention will be apparent from the following description, the accompanying drawings and the appended claims.

BRIEF DESCRIPTION OF THE DRAWINGS

FIG. 3 is a fragmentary perspective view of the left side of the truck body shown in FIGS. 1 & 2 and illustrating a conventional truck battery and a higher voltage auxiliary power supply in accordance with the invention;

FIG. 4 is a fragmentary view behind the seats of the truck cab and showing a 12 to 24 volt voltage converter and 110 volt battery charger used in the liquid distributing system;

FIG. 10 is a diagram showing the liquid distributing flow lines and control valves used in the system within the lawn care truck shown in FIGS. 1-6.

DESCRIPTION OF THE PREFERRED EMBODIMENT

Figure 1:
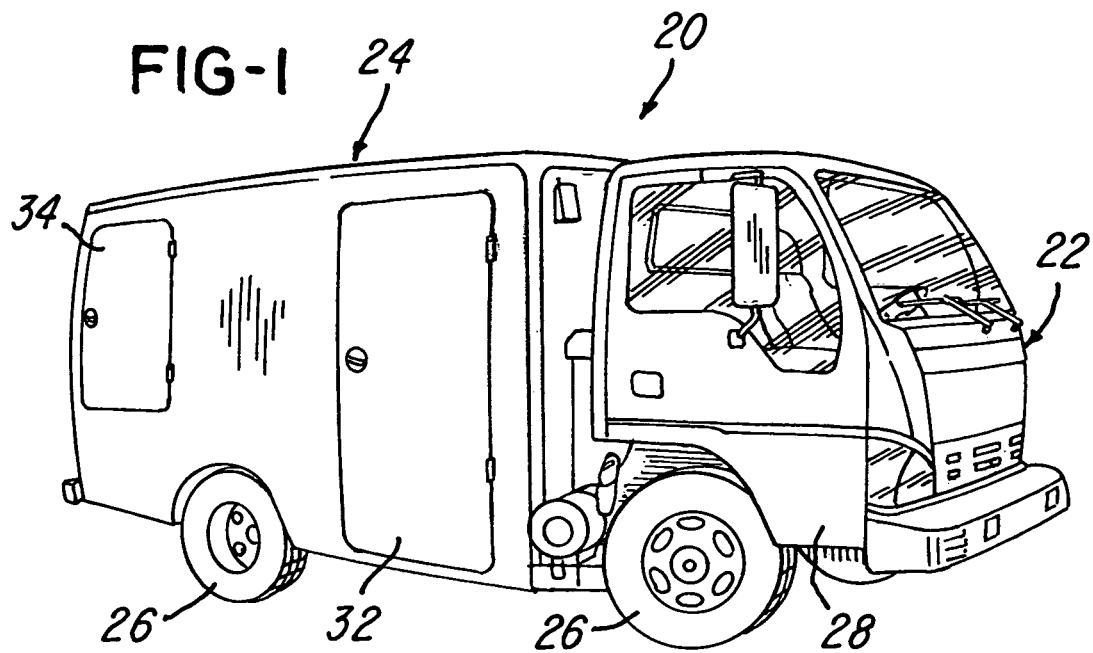
FIGS. 1 & 2 are perspective views of a lawn care vehicle or truck and which incorporates an electric/hydraulic liquid distributing system constructed and used in accordance with the invention.
Figure 2:
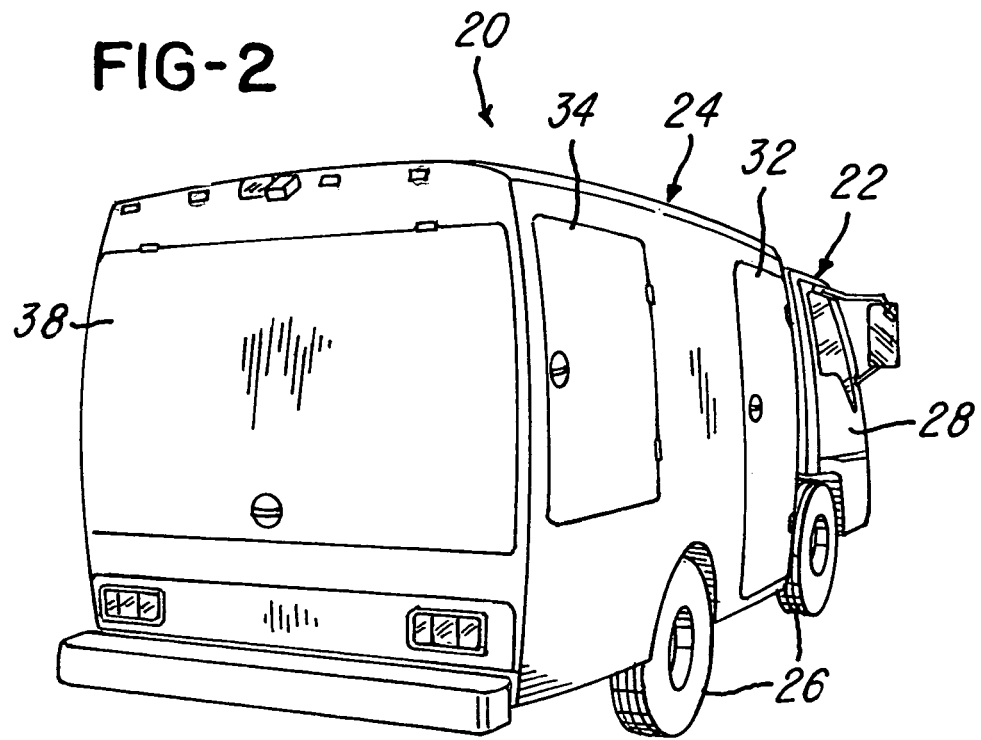

FIGS. 1 and 2 illustrate a commonly used lawn care service vehicle or truck 20 having a cab 22 and a body 24 mounted on a chassis supported by a set of wheels 26. In a conventional manner, the cab 22 encloses the gasoline or diesel engine connected to drive the rear wheels 26 and also to drive, among other accessories, an alternator or charger for a 12 volt truck battery. The cab 22 has two front doors 28, and the body 24 has two right side doors 32 and 34, a lower left door 36 (FIG. 3) and a rear door 38. As also shown in FIG. 3, the lower panel or door 36 encloses a conventional 12 volt truck battery 42. A lawn care truck also commonly encloses one or more liquid chemical supply tanks such as the tanks 45 and 48 (FIGS. 6 and 10) which carry liquid fertilizer and other liquid chemicals commonly used for lawn care. It is also common for a lawn care truck to have one or more hose reel assembles such as the reel assembly 50 (FIGS. 6 and 8) on which is wound a flexible hose 52 having an outer end portion connected to a spray nozzle 54 (FIG. 10) having a manually operated valve. While one form of lawn care truck 20 is illustrated in FIGS. 1-3, it is understood that the truck may have other forms.

Figure 7:
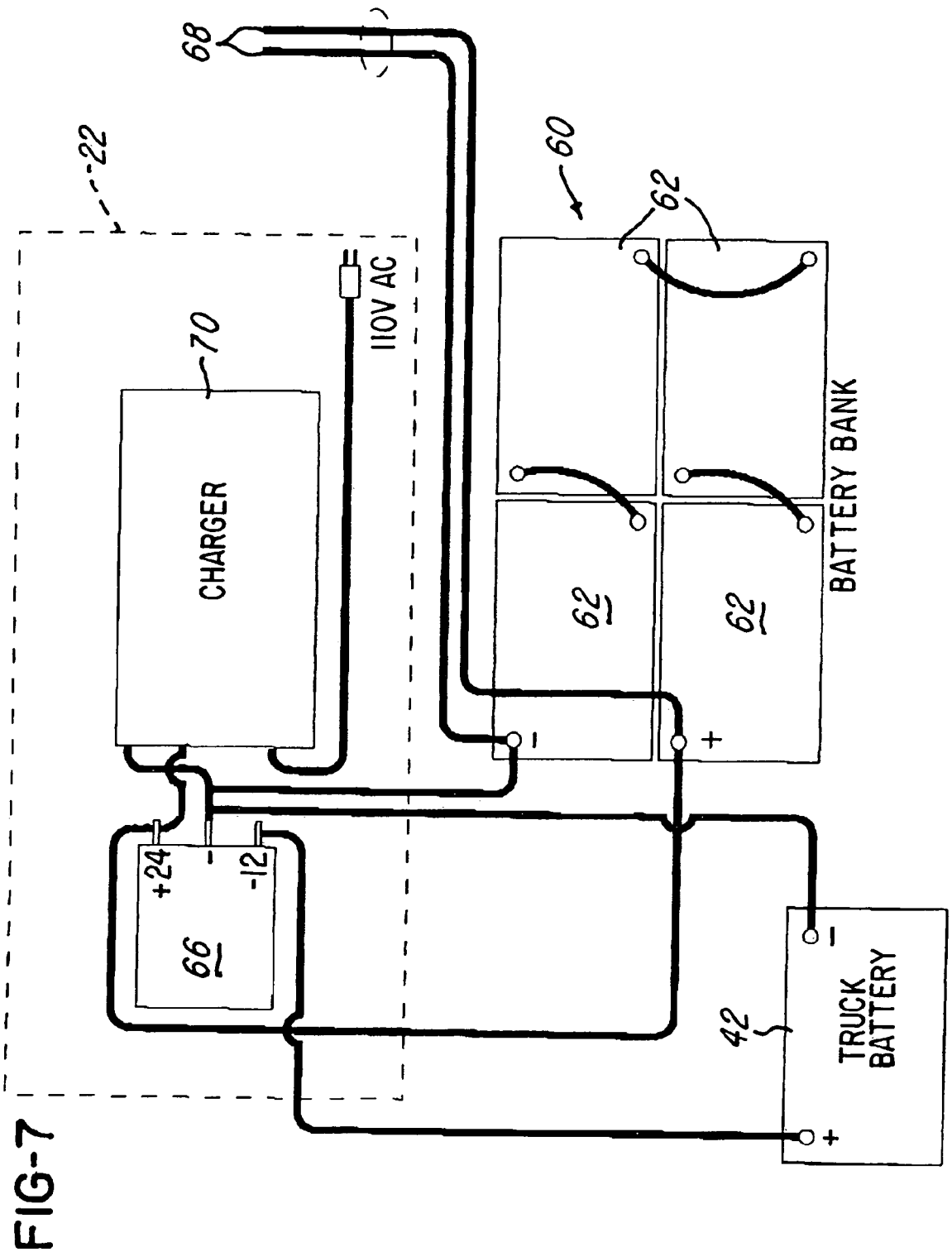
FIG. 7 is an electrical diagram of the electrical power supply for operating the liquid distributing system in accordance with the invention.

In accordance with the present invention, an auxiliary battery supply 60 (FIGS. 3 & 7) includes four 6 volt batteries 62 connected in series to provide an output of 24 volts DC. The auxiliary battery supply 60 is connected to a voltage converter 66 (FIG. 7) which also receives the 12 volt DC output of a truck battery 42 which is charged, in a conventional manner, by a 12 volt alternator or battery charger driven by the truck engine. Thus the conductors 68 (FIG. 7) provide a 24 volt DC output. As also shown in FIG. 7, a 110 volt AC battery charger 70 has a 24 volt output which is also connected to the voltage converter 66. The voltage converter 66 and AC battery charger 70 are supported by a vertical plate 74 (FIG. 4) mounted within the truck cab 22 adjacent the rear cab wall and behind the folding back cushions 76 of a set of truck seats 78.

Figure 5:
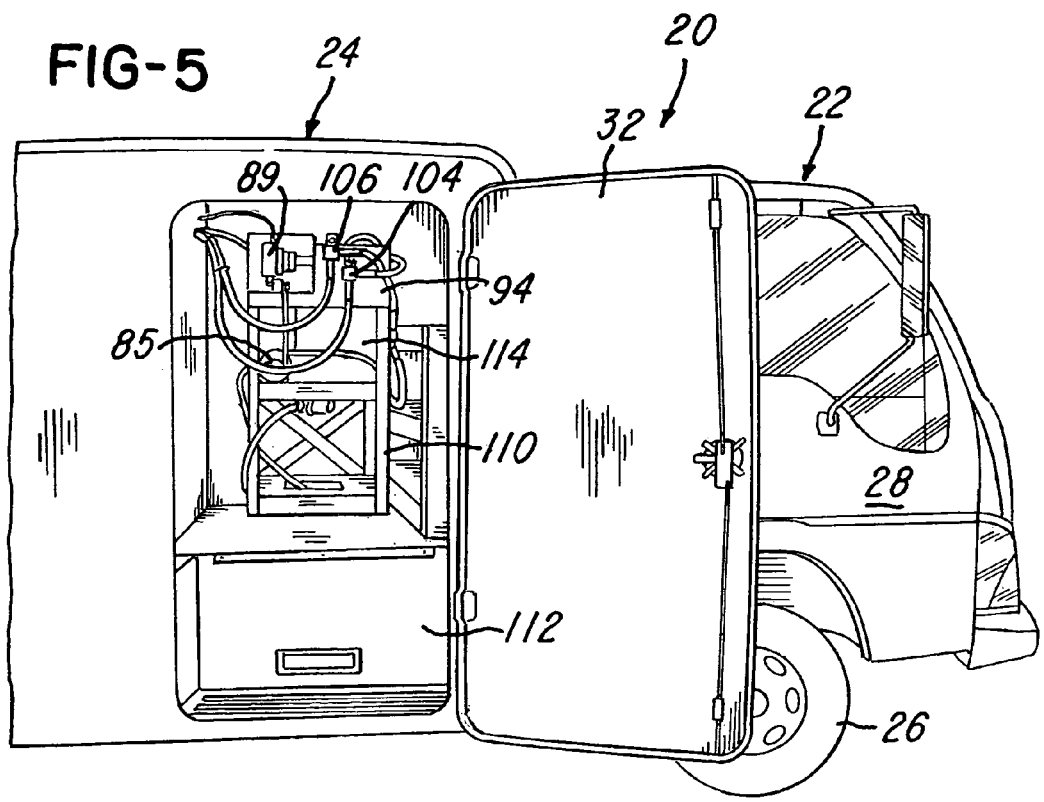
FIG. 5 is a fragmentary side view of the truck body and showing an open front compartment which encloses the electric motor driven hydraulic pump system connected to operate the hydraulic motors for driving the liquid distributing pump and rotating the hose reel.
Figure 8:
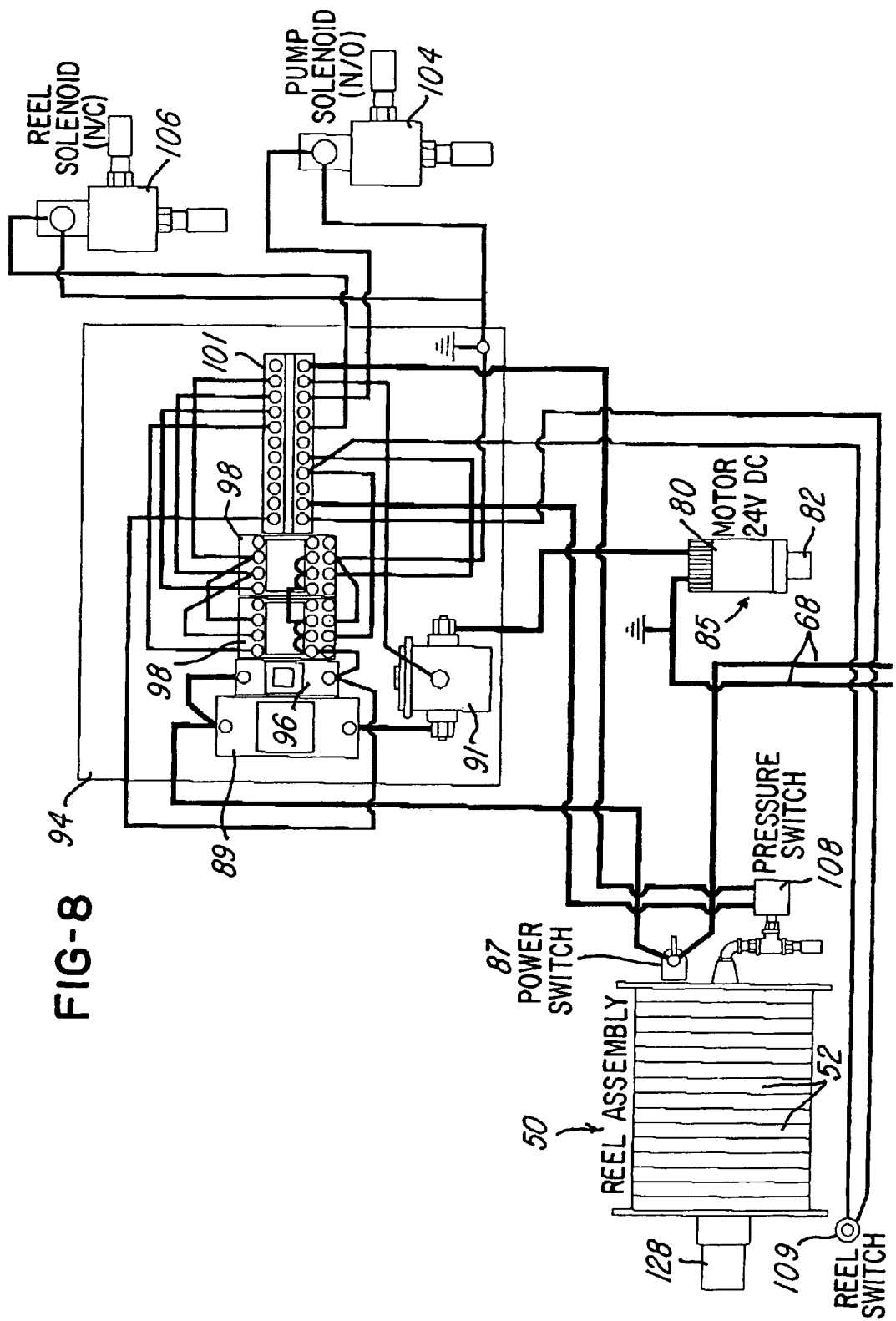
FIG. 8 is a continuation of the electrical diagram shown in FIG. 7 for operating the electric motor driven hydraulic pump and showing the controls for operating the hydraulic motors for the liquid distributing pump and hose reel.

Referring to FIG. 8, the 24 volt DC conductors 68 supply power to a 24 volt DC electric motor 80 which is coupled to a hydraulic pump 82 to form a combined unit 85. The motor 80 is controlled by a power switch 87 located adjacent the hose reel assembly 50 and is connected to a circuit breaker 89 and solenoid 91 back to the motor 80. The circuit breaker 89 and solenoid 91 are mounted on a vertical panel 94 which also supports another circuit breaker 96, a pair of relays 98 and a terminal block 101. The 24 volt auxiliary power supply is supplied from the terminal block 101 to a normally open solenoid valve 104 and to a normally closed solenoid valve 106 which are also supported by the panel 94. When the solenoid valve 104 is open, a pressure switch 108 opens to allow liquid to flow into the hose 52 extending from the hose reel assembly 50. A reel switch 109 (FIG. 8) controls the operation of the reel assembly 50 through the solenoid 106. As shown in FIG. 5, the electric motor hydraulic pump unit 85 and the components mounted on the panel 94 are supported by a shelf on a fabricated metal stand 110 located within a compartment of the body 24 directly behind the cab 22 above a storage compartment 112. The stand 110 also supports a hydraulic reservoir tank 114 located adjacent the motor/pump unit 85. The side door 32 provides convenient access to the reservoir tank 114, the electric motor hydraulic pump unit 85, the storage compartment 112 and the components mounted on the panel 94.

Figure 6:
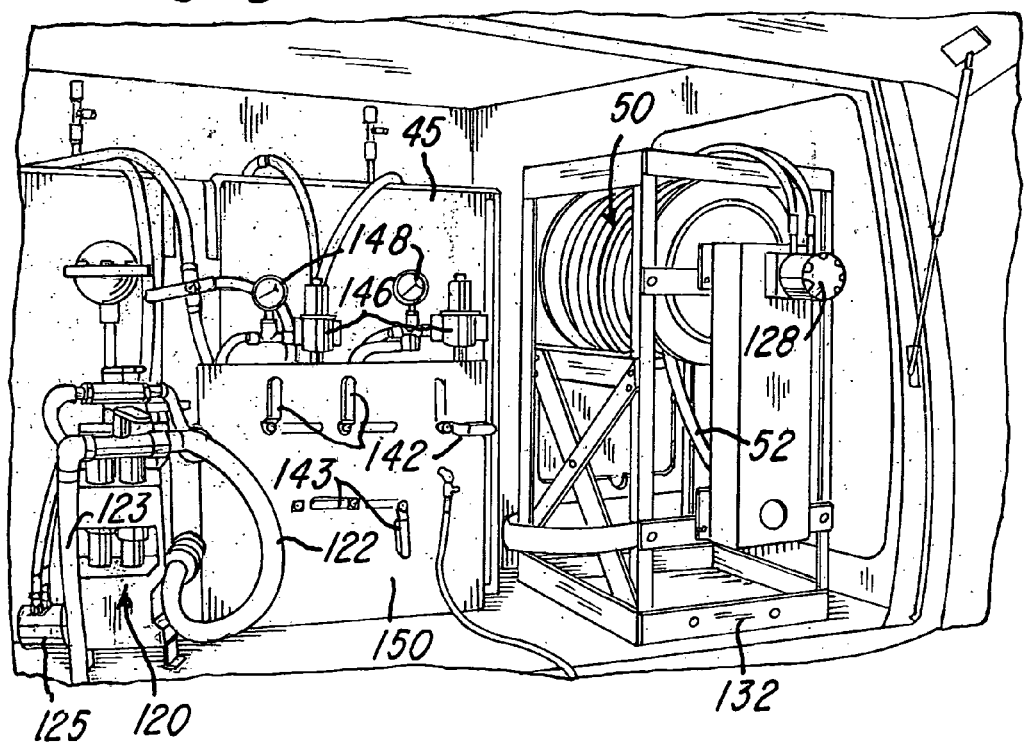
FIG. 6 is a fragmentary perspective view of an open rear compartment of the truck body and showing a liquid supply tank and a liquid distributing pump and hose reel both operated by hydraulic motors in accordance with the invention.
Figure 9:
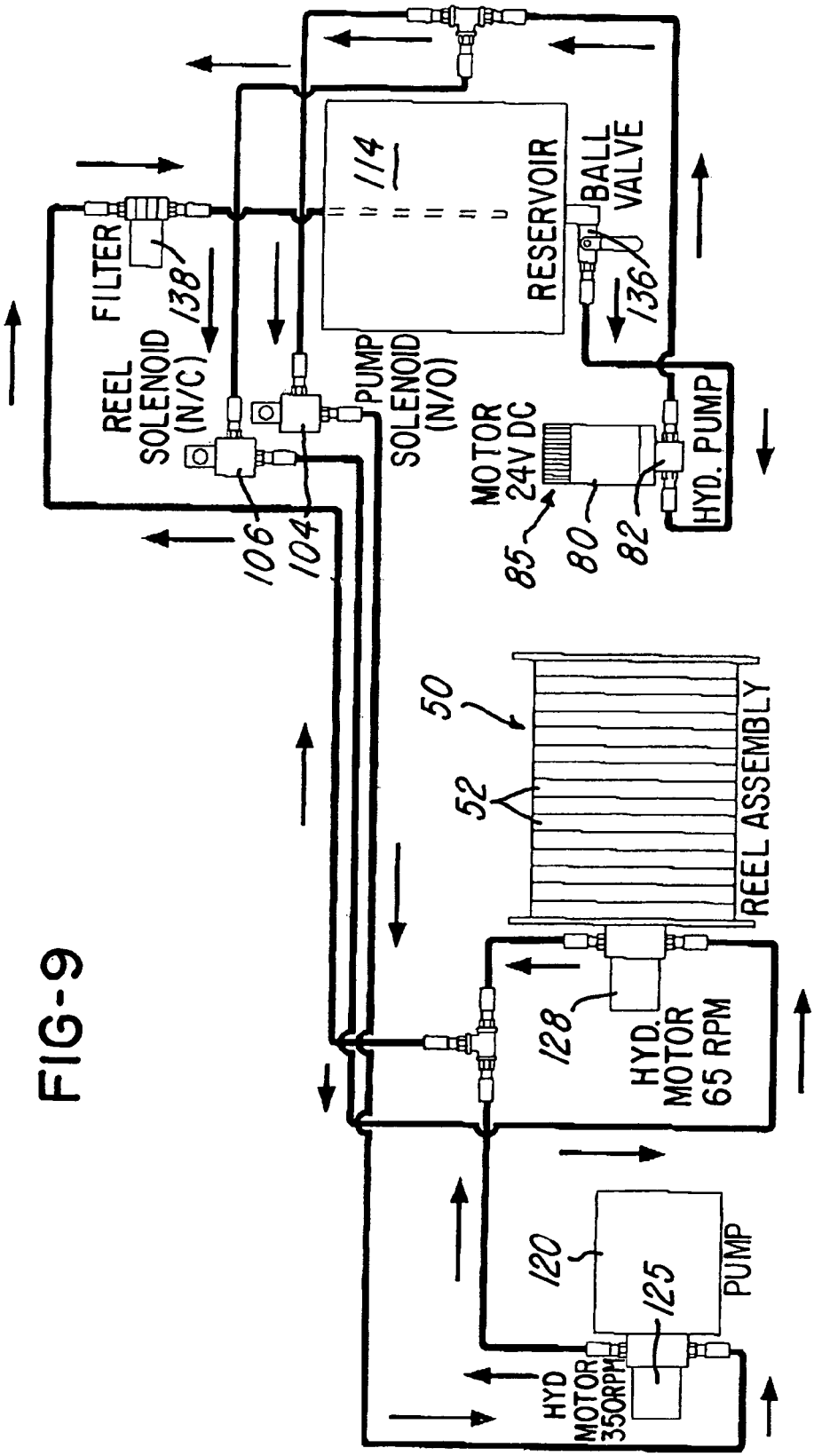
FIG. 9 is a diagram of the hydraulic system for operating the liquid distributing pump and a hose reel.

Referring to FIG. 6, a piston-type liquid chemical supply pump 120 is connected by lines 122 and 123 to the liquid chemical supply tanks 45 and 48, respectively (FIG. 10), and the crank for operating the pistons within the pump 120 are driven by a hydraulic motor 125 connected to the solenoid valve 104, as shown in FIG. 9. The electric motor hydraulic pump unit 85 also supplies hydraulic fluid to another hydraulic motor 128 (FIGS. 6 and 9) connected to rotate or drive the hose reel assembly 50. As shown in FIG. 6, the hose reel assembly 50 is supported in a rear compartment of the truck body 24 by a fabricated metal stand 132 which is also adapted to support a second hose reel assembly (not shown in FIG. 6) below the upper hose reel assembly 50. FIG. 9 shows the hydraulic lines which connect the electric motor hydraulic pump unit 85 to the reservoir tank 114 and to the hydraulic motors 125 and 128 for the liquid supply pump 120 and hose reel assembly 50, respectively. The hydraulic line connecting the hydraulic fluid reservoir tank 114 to the hydraulic pump 82 has an on/off ball valve 136, and the hydraulic fluid return line to the reservoir tank 114 is provided with a hydraulic fluid filter 138.

FIG. 10 illustrates the liquid chemical supply lines extending from the liquid supply pump 120 to two hose reel assemblies 50, and the lines are provided with lever actuated control valves 142 and 143, pressure regulators 146 and pressure gauges 148. The control valves 142 and 143 are supported by a vertical control panel 150 (FIG. 6) mounted in the rear compartment of the truck body 24 and are conveniently accessible and viewable along with the supply pump 120, hydraulic motors 125 and 128, and pressure gauges 148 when the rear door 38 of the truck body is raised upwardly to its open position as shown in FIG. 6. Liquid chemicals are supplied to the tanks 45 and 48 through fill lines having closure valves 154 (FIG. 10).

As apparent from the drawings and the above description, a lawn care truck and liquid chemical distributing system constructed and used in accordance with the invention provides desirable features and advantages. That is, the use of the higher voltage auxiliary battery supply 60 connected to the truck battery 42 through the voltage converter 66 and in combination with the electric motor hydraulic pump unit 85 to drive each of the hydraulic motors 125 and 128, enables the truck engine to be shut down at each lawn care site during a day of service by the truck. As a result, substantial fuel savings is provided for each lawn care truck during each day of operation, and such fuel savings may be obtained by each of the many thousands of lawn care trucks in daily operation throughout the U.S.A. In the event that the auxiliary battery supply 60 is not fully charged by the truck battery charger and through the voltage converter 66 at the end of each day, the 110 volt AC battery charger 70 may be plugged into a 110 volt AC power supply to recharge the auxiliary battery supply 60 during the night when the lawn care service truck is not in use. In addition, the locations and positions of the auxiliary battery supply 60, the voltage converter 66, the battery charger 70, the electric motor hydraulic pump unit 85 and reservoir tank 114 within their corresponding compartments of the lawn care truck, provide for easy and convenient access to each of these components of the system.

While the lawn care truck and its method of use herein described constitute one preferred embodiment of the invention, it is to be understood that the invention is not limited to the precise truck and method described, and that changes may be made therein without departing from the scope and spirit of the invention as defined in the appended claims.

What is claimed is:

1. A method of supplying a lawn care liquid from a liquid supply tank on a wheel supported lawn care truck to a liquid distributing hose extending from a hose reel on the truck, the truck having an engine for driving a set of wheels and a truck battery charger for charging a truck battery, the method comprising the steps of:
   a) mounting an auxiliary battery supply on the truck,
   b) arranging the auxiliary battery supply to provide an output voltage greater than the output voltage of the truck battery,
   c) connecting a voltage converter between the truck battery and the auxiliary battery supply to provide for recharging the higher voltage auxiliary battery supply with the truck battery charger,
   d) connecting an electric motor driven hydraulic pump to the auxiliary battery supply,
   e) connecting the hydraulic pump by a hydraulic line to a hydraulic motor connected to drive a liquid distributing pump in a line extending between the liquid supply tank and the liquid distributing hose,
   f) shutting off the truck engine after the truck arrives at a lawn site where lawn care service is desired,
   g) operating the electric motor hydraulic pump from the auxiliary battery supply while the truck engine is shut off,
   h) operating the liquid distributing pump with the hydraulic motor while the truck engine is shut off, and
   i) recharging the auxiliary battery supply with the engine driven battery charger after the truck engine is restarted and the truck is moving to another lawn care site.

2. A method as defined in claim 1 and including the step of connecting a 110 volt AC battery charger to the voltage converter to provide for recharging the auxiliary battery supply when the truck engine is shut down and the lawn care truck is not in use.

3. A method as defined in claim 2 wherein the lawn care truck has a cab with a seat having a folding back cushion, and including the step of locating the converter and the 110 volt battery charger in the cab behind the back cushion of the seat.

4. A method as defined in claim 1 and including the step of connecting a second hydraulic motor to rotate the hose reel, and connecting the electric motor driven hydraulic pump with a hydraulic fluid line to the second hydraulic motor.

5. A method of supplying a lawn care liquid from a liquid supply tank on a wheel supported lawn care truck to a liquid distributing hose extending from a hose reel on the truck, the truck having an engine for driving a set of wheels and a truck battery charger for charging a 12 volt truck battery, the method comprising the steps of:
   a) mounting an auxiliary battery supply on the truck,
   b) connecting the auxiliary battery supply to provide a 24 volt output voltage,
   c) connecting a 12 volt to 24 volt voltage converter between the truck battery and the auxiliary battery supply to provide for recharging the 24 volt auxiliary batter supply with the 12 volt truck batter charger,
   d) connecting an electric motor driven hydraulic pump to the auxiliary battery supply,
   e) connecting the hydraulic pump by a hydraulic line to a hydraulic motor connected to drive a liquid distributing pump in a line extending between the liquid supply tank and the liquid distributing hose,
   f) shutting off the truck engine after the truck arrives at a lawn site where lawn care service is desired,
   g) operating the electric motor hydraulic pump from the auxiliary battery supply while the truck engine is shut off,
   h) operating the liquid distributing pump with the hydraulic motor while the truck engine is shut off, and
   I) recharging the 24 volt auxiliary battery supply with the engine driven 12 volt battery charger through the voltage converter after the truck engine is restarted and the truck is moving to another lawn care site.

6. A method as defined in claim 5 and including the step of connecting a 110 volt AC battery charger having a 24 volt output to the voltage converter to provide for recharging the 24 volt auxiliary battery supply when the truck engine is shut down and the lawn care truck is not in use.

7. A method as defined in claim 6 wherein the lawn care truck has a cab with a seat having a folding back cushion, and including the step of locating the voltage converter and the 110 volt battery charger in the cab behind the back cushion of the seat.

8. A method as defined in claim 5 and including the step of connecting a second hydraulic motor to rotate the hose reel, and connecting the electric motor driven hydraulic pump with a hydraulic fluid line to the second hydraulic motor.

9. In a lawn care truck including a truck body supported by a set of wheels driven by a truck engine and having a truck battery and a battery charger driven by the truck engine for charging the truck battery, an improved liquid distributing system for supplying a lawn care liquid from a liquid supply tank carried by the truck to a flexible liquid distributing hose extending from a hose reel carried by the truck, said system comprising an auxiliary battery supply mounted on said truck, an electric motor driven hydraulic pump connected to said auxiliary battery supply, a liquid distributing pump driven by a first hydraulic motor and connected by lines to supply a lawn care liquid from said supply tank to said hose, a hydraulic line connecting said electric motor driven hydraulic pump to said first hydraulic motor, and said truck battery connected to said auxiliary battery supply for charging said auxiliary battery supply with said engine driven battery charger to provide for operating said liquid distributing pump by said electric motor driven hydraulic pump and said auxiliary battery supply while said truck engine is shut down at a lawn care site.

10. A lawn care truck and liquid distributing system as defined in claim 9 wherein said auxiliary battery supply comprises a series of auxiliary batteries connected to supply a voltage greater than the voltage of said truck battery, and a voltage converter connecting said auxiliary batteries to said truck battery to provide for simultaneously charging said auxiliary batteries and said truck battery by said truck battery charger.

11. A lawn care truck and liquid distributing system as defined in claim 10 wherein said voltage converter is connected to a 110 volt AC battery charger to provide for charging said auxiliary batteries when said truck engine is not in use.

12. A lawn care truck and liquid distributing system as defined in claim 11 wherein said truck includes a front cab having a seat with a folding back cushion, and said converter and said AC battery charger are located within said cab rearwardly of said back cushion.

13. A lawn care truck and liquid distributing system as defined in claim 9 and including a second hydraulic motor connected to rotate said hose reel, and said second hydraulic motor is connected by a hydraulic line to said electric motor driven hydraulic pump.

14. A lawn care truck and liquid distributing system as defined in claim 9 wherein said truck body has a lower portion with a lower side door enclosing said truck battery, and said auxiliary battery supply is also located in said lower portion of said truck body and enclosed by said lower side door.

15. A lawn care truck and liquid distributing system as defined in claim 9 wherein said truck body has a forward compartment directly behind a front cab and having a side door, and said electric motor driven hydraulic pump is located with said compartment along with a hydraulic fluid reservoir tank connected to said hydraulic pump.

16. In a lawn care truck including a truck body supported by a set of wheels driven by a truck engine and having a 12 volt truck battery and a 12 volt battery charger driven by the truck engine for charging the truck battery, an improved liquid distributing system for supplying a lawn care liquid from a liquid supply tank carried by the truck to a flexible liquid distributing hose extending from a hose reel carried by the truck, said system comprising a 24 volt auxiliary battery supply mounted on said truck and including a series of auxiliary batteries connected together, a voltage converter connecting said 24 volt auxiliary battery supply to said truck battery, a 24 volt electric motor driven hydraulic pump connected to said auxiliary battery supply, a liquid distributing pump driven by a first hydraulic motor and connected by lines to supply a lawn care liquid from said supply tank to said hose, a hydraulic line connecting said electric motor driven hydraulic pump to said first hydraulic motor, and said 24 volt auxiliary battery supply connected to be recharged through said voltage converter by said engine driven battery charger to provide for operating said liquid distributing pump by said electric motor driven hydraulic pump and said auxiliary battery supply while said truck engine is shut down at a lawn care site.

17. A lawn care truck and liquid distributing system as defined in claim 16 wherein said voltage converter is connected to a 110 volt AC battery charger having a 24 volt output to provide for charging said auxiliary batteries when said truck engine is not in use.

18. A lawn care truck and liquid distributing system as defined in claim 17 wherein said truck includes a front cab having a seat with a folding back cushion, and said converter and said AC battery charger are located within said cab rearwardly of said back cushion.

19. A lawn care truck and liquid distributing system as defined in claim 16 and including a second hydraulic motor connected to rotate said hose reel, and said second hydraulic motor is connected by a hydraulic line to said electric motor driven hydraulic pump.

\* \* \* \* \*